(12) United States Patent
Kuznetsov et al.

(10) Patent No.: US 9,769,052 B2
(45) Date of Patent: Sep. 19, 2017

(54) SYSTEM TESTING FRAMEWORK (71) Applicant: Red Hat Israel, Ltd., Raanana (IL)

(72) Inventors: Dmitry Kuznetsov, Petach Tikva (IL); Barak Azulay, Nes-Ziona (IL)

(73) Assignee: Red Hat Israel, Ltd., Raanana (IL)

( * ) Notice: Subject to any disclaimer, the term of this patent is extended or adjusted under 35 U.S.C. 154(b) by 392 days.

(21) Appl. No.: 14/631,988

(22) Filed: Feb. 26, 2015

(65) Prior Publication Data

US 2016/0254982 A1     Sep. 1, 2016

(51) Int. Cl.
G06F 15/16      (2006.01)
H04L 12/26      (2006.01)
H04L 29/08      (2006.01)
H04L 12/24      (2006.01)
G06F 11/36      (2006.01)
G06F 9/445      (2006.01)
G06F 9/455      (2006.01)

(52) U.S. Cl.
CPC .............. H04L 43/50 (2013.01); G06F 8/61 (2013.01); G06F 9/45558 (2013.01); G06F 11/36 (2013.01); H04L 29/08072 (2013.01); H04L 41/04 (2013.01); G06F 2009/45562 (2013.01); G06F 2009/45575 (2013.01)

(58) Field of Classification Search
CPC .......................... H04L 29/08072; H04L 29/06
USPC ............... 709/203, 220, 224, 227, 232, 238
See application file for complete search history.

(56) References Cited

U.S. PATENT DOCUMENTS

| | | | |
|---|---|---|---|
| 6,434,628 B1 * | 8/2002 | Bowman-Amuah ... | H04L 29/06 714/1 |
| 6,438,594 B1 * | 8/2002 | Bowman-Amuah ......... | G06F 9/4428 709/203 |
| 6,442,748 B1 * | 8/2002 | Bowman-Amuah ..... | G06F 8/20 707/999.009 |
| 6,477,665 B1 * | 11/2002 | Bowman-Amuah ... | G06F 11/22 712/244 |
| 6,496,850 B1 * | 12/2002 | Bowman-Amuah ................. | G06F 9/4435 707/999.102 |
| 8,181,159 B2 | 5/2012 | Khalil et al. | |
| 8,489,929 B2 | 7/2013 | Lam et al. | |
| 8,588,094 B2 | 11/2013 | Matsuoka | |
| 8,762,780 B2 | 6/2014 | Arscott et al. | |

(Continued)

OTHER PUBLICATIONS

Vagrant, http://www.vagrantup.com/, retrieved from the Internet on Mar. 18, 2015, 1 page.

(Continued)

*Primary Examiner* — Khanh Dinh (74) *Attorney, Agent, or Firm* — Lowenstein Sandler LLP (57) ABSTRACT

Implementations provide for a system testing framework for computer systems. A method of the disclosure includes building representations of resources of a product to be tested, the resources built from source code of the product and revisions to the source code, initializing, on a single computing device, virtual resources from the representations, installing software of the product on the initialized virtual resources, saving a clean state of the initialized virtual resources and of the installed product on the initialized virtual resources, causing a test scenario to be performed on the installed software of the product executing on the virtual resources, and reverting the virtual resources and the installed software of the product to the clean state.

20 Claims, 5 Drawing Sheets (56) References Cited

U.S. PATENT DOCUMENTS

| | | | |
|---|---|---|---|
| 8,850,427 B2 | 9/2014 | Arscott et al. | |
| 2003/0023686 A1* | 1/2003 | Beams | G09B 5/14 709/205 |
| 2006/0059253 A1* | 3/2006 | Goodman | G06Q 10/10 709/223 |
| 2014/0215271 A1 | 7/2014 | Oh et al. | |
| 2014/0310390 A1 | 10/2014 | Sorenson, III et al. | |

OTHER PUBLICATIONS

Gowri, G. and Amutha, M., "Cloud Computing Applications and their Testing Methodology", Department of CSE, Nehru Institute of Engineering and Technology, Coimbatore, India, http://www.ljircce.com/upload/2014/february/7B_Cloud.pdf, Feb. 2014, 10 pages.

White Paper, "Accelerate Software Development, Testing and Deployment with the VMware Virtualization Platform", VMware, Inc., http://www.vmware.com/pdf/dev_test.pdf, 2005, 12 pages.

"How is Docker.io Different from a Normal Virtual Machine?", http://stackoverflow.com/questions/16047306/how-is-docker-io-different-from-a-normal-virtual-machine, [retrieved from the internet on Mar. 13, 2015], 4 pages.

Calheiros, Rodrigo N. et al., "CloudSim: A Novel Framework for Modeling and Simulation of Cloud Computing Infrastructures and Services", Grid Computing and Distributed Systems (GRIDS) Laboratory Department of Computer Science and Software Engineering The University of Melbourne, Australia; Pontifical Catholic University of Rio Grande do Sul Porto Alegre, Brazil, http://arxiv.org/pdf/0903.2525.pdf, Mar. 13, 2009, 9 pages.

OVirt Testing Framework, "Source", https://bitbucket.org/ydary/ovirt-testing-framework/src, [retrieved from the internet on Mar. 13, 2015], 4 pages.

OVirt, "Features/TestingFramerwork", https://www.ovirt.org/Features/TestingFramework, retrieved from the internet on Mar. 13, 2015, 3 pages.

* cited by examiner

Build representations of resources of tested product from provided source code of product and revisions to source code
410

Deploy virtual resources to represent tested resources of product, where all initialized resources executed on a single machine
420

Clone virtual test environment of the deployed virtual resources to one or more other virtual test environments
430

Perform test scenarios, in parallel, on the deployed virtual resources with installed product in each of the virtual test environments
440

SYSTEM TESTING FRAMEWORK

TECHNICAL FIELD

The implementations of the disclosure relate generally to computer systems and, more specifically, relate to system testing framework for computer systems.

BACKGROUND

Distributed systems include several autonomous computational entities (i.e., components) communicating with each other. Testing applications utilizing such distributed systems can be a cumbersome and inefficient process. The testing system for such application may depend on resources scattered across a data center that might become unavailable (e.g., network failures and unreachable storage) or broken (e.g., servers not cleaning up properly after previous tests).

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for a system testing framework for computer systems. The system testing framework of implementations of the disclosure virtualizes all resources used for testing of a system on a single machine by simulating all servers with virtual machines (VMs). The VMs are each created from a template (e.g., a VM snapshot) and can connect with each other via a network bridge. Implementations of the disclosure allow the testing system to be less dependent on outside resources and eliminate the clean-up process after testing (via the use of templates/snapshots) as created resources can be destroyed. In addition, once all resources are running and some basic tests are executed, additional test-phase snapshots may be created of the tested system. Various scenarios can be tested from these test-phase snapshots, each scenario starting from a "clean" slate as provided from the test-phase snapshots.

Prior solutions for system testing frameworks used multiple disparate resources (e.g., separate physical machines) for testing of products using distributed resources for execution. These prior solutions for system testing frameworks often suffered from testing failures due to reasons beyond the scope of the tested product, including unavailable resources or failure of components. Furthermore, a cumbersome and inefficient clean-up process was typically required by the prior solutions between test iterations. Implementations of the disclosure overcome the drawbacks of prior solutions by virtualizing all resources used for testing of a system on a single machine. In particular, virtualizing can involve simulating all servers with VMs, and utilizing snapshot images for efficient and simple reversion of the testing system between test iterations.

Figure 1:
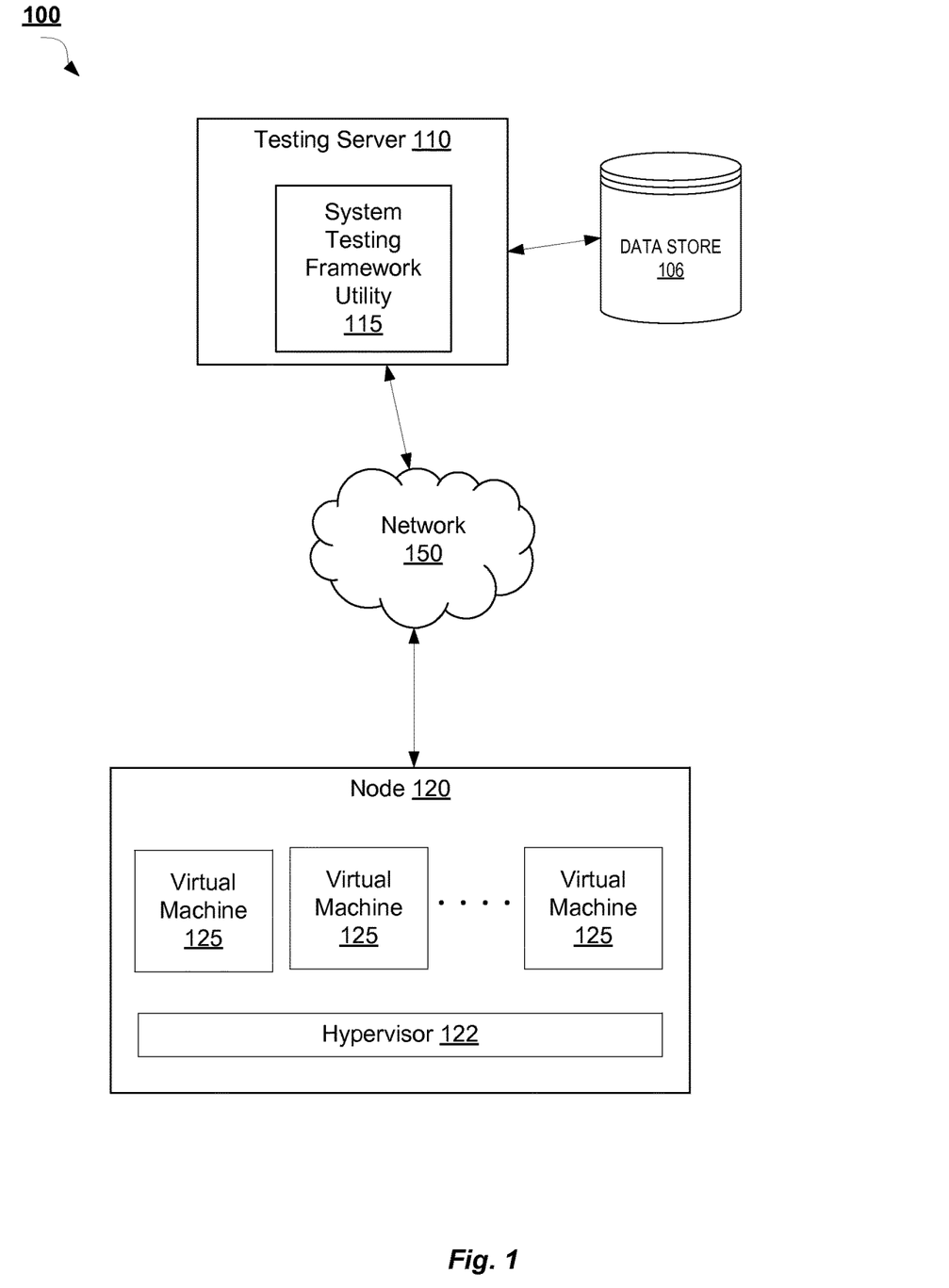
FIG. 1 is a block diagram of a network architecture for a system testing framework according to implementations of the disclosure.

FIG. 1 is a block diagram of a network architecture 100 for providing a system testing framework according to implementations of the disclosure. Network architecture 100 may include a testing server 110 communicably coupled to a node 120 either directly and/or via a network 150. Network 150 can be a local area network (LAN), a wireless network, a telephone network, a mobile communications network, a wide area network (WAN), such as the Internet, or similar communication system.

Testing server 110 may be any type of computer system including, but not limited to, server computers, gateway computers, desktop computers, laptop computers, mobile communications devices, cell phones, smart phones, handheld computers, tablets, or similar computing devices. A computer system herein may refer to a system comprising one or more processors, one or more memory devices, and/or one or more input/output (I/O) interfaces. Testing server 110 may include, for example, computer system 500 of FIG. 5.

Testing server 110 may include a system testing framework utility 115 to provide a framework to facilitate system testing of products (e.g., a platform virtualization management web application product, etc.) that are, when in production, deployed on several machines. The system testing framework utility 115 enables system testing of such products without having to clean-up and provision multiple physical hosts and while being independent of network and storage unavailability. The system testing framework utility 115 creates a virtual testing system for the product under test that includes VMs and a virtual network all running on a single host. Referring to FIG. 1, the system testing framework utility 115 simulates resources of a tested product using VMs 125 running on a single node 120.

Node 120 may be any type of computing system including, but not limited to, server computers, gateway computers, desktop computers, laptop computers, mobile communications devices, cell phones, smart phones, hand-held computers, tablets, or similar computing devices. Node 120 may include, for example, computer system 500 of FIG. 5. In some implementations, testing server 110 and node 120 are the same computing device, and system testing framework utility 115 may execute on node 120.

In one implementation, node 120 may be a computer system running an operating system and a hypervisor 122. Hypervisor 122 may emulate an underlying hardware platform of the node 120 for one or more VMs, such as VMs 125. The hypervisor 122 may also be known as a virtual machine monitor (VMM) or a kernel-based hypervisor. In some implementations, the hypervisor 122 is part of a host OS of the node 120. VMs 125 can be, for example, hardware emulation, full virtualization, para-virtualization, and operating system-level virtualization VMs. Each VM 125 may include a guest OS that may differ among the VMs 125. The guest OS may host one or more applications within the VM 125. Moreover, the guest OSes and the host OS may share the same OS type, or the host OS may be a different type of OS than guest OSes.

The VMs 125 may be created by system testing framework utility 115 from a template (e.g., a VM snapshot). A snapshot may refer to an image of the state of a system (all stored information about the system at the given instant in time) at a particular point in time. The image may be stored in a non-volatile form such as a file. In one implementation, the system testing framework utility 115 is communicably coupled to a data store 106. Data store 106 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. In one implementation, system testing framework utility stores information, such as source code and code revisions of the tested product, deployment configurations of the tested product (e.g., VM templates/snapshots), test information, test result data, and so on, in the data store 106.

The VMs 125 are provisioned by system testing framework utility 115 to be able to network with one another via a network bridge. Implementations of the disclosure allow the virtual testing system (e.g., the deployed collection of VMs 125) to be less dependent on outside resources as all resources can be deployed on a single machine of the node 120. Furthermore, the implementation of the virtual test system by system testing framework utility 115 eliminates any clean-up process after testing (via the use of the templates/snapshots), as the created resource can be easily destroyed once a test has been run. In addition, once all resources are running and some basic initial tests are run, additional test-phase snapshots of the tested system may be created by the system testing framework utility 115. Various scenarios can then subsequently be run from these test-phase snapshots, where each scenario starts from a "clean slate" as provided by the test-phase snapshots.

In addition, the virtual test system created by VMs 125 can be used to increase the concurrency of tests. A considerable amount of time for testing is allocated to building tested resources of the product into installable executables, deploying the executables to the VMs 125, and booting up from the snapshots. Building the resource and deploying the executables are done in a serial manner before the test can begin. However, the system testing framework utility 115 can reduce overall time of running all tests cloning the deployed testing environment into other identical environments (either on the same node 120 or on another connected node). The cloned environments can then be utilized to run additional instances of the test.

Figure 2:
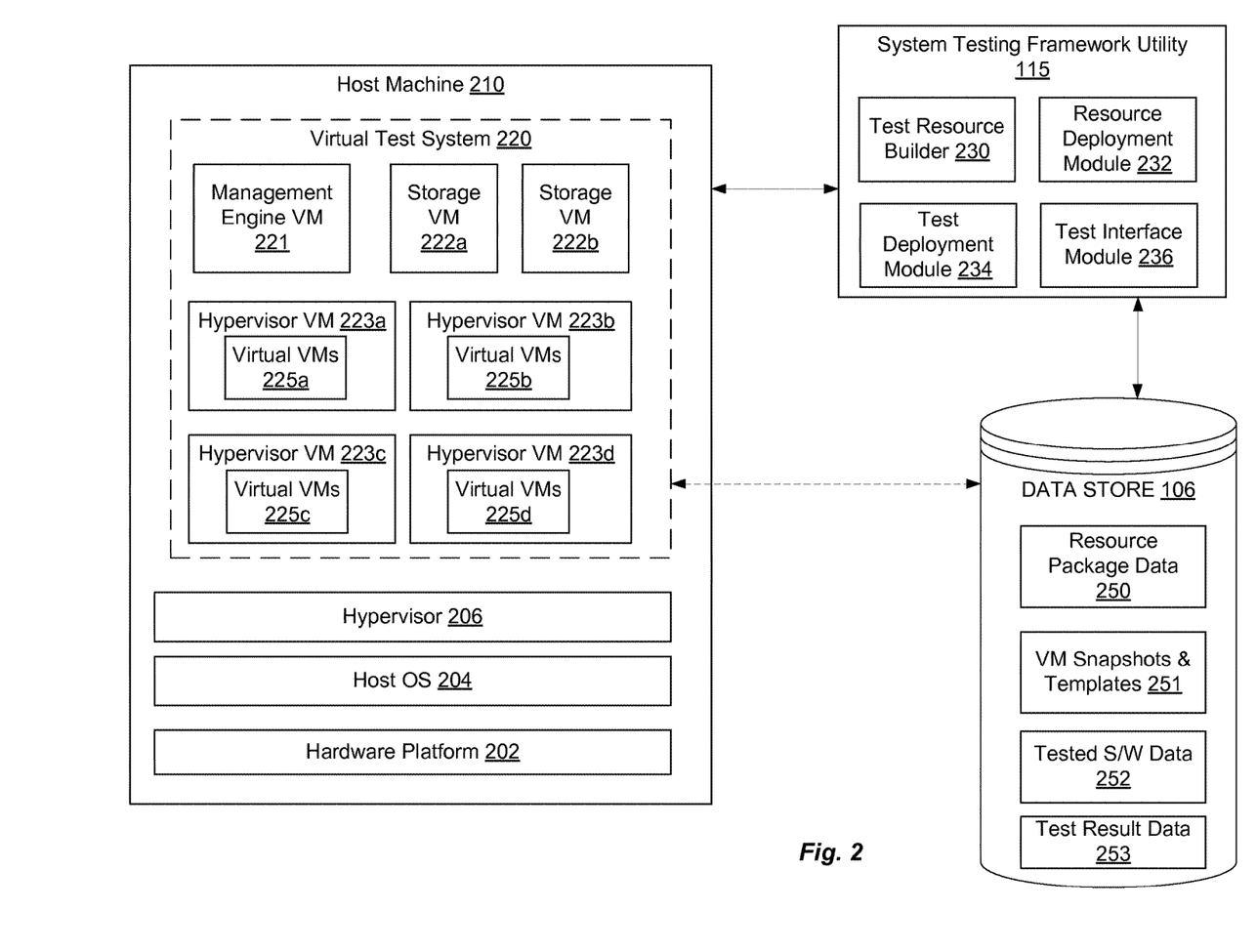
FIG. 2 is a block diagram of a system testing framework utility, a host machine, and a data store according to implementations of the disclosure.

FIG. 2 is a block diagram of a system testing framework utility 115, a host machine 210, and a data store 106 according to implementations of the disclosure. In one implementation, system testing framework utility 115 and data store 106 are the same as their counter parts described with respect to FIG. 1. Similarly, in one implementation, host machine 210 may be the same as node 120 described with respect to FIG. 1.

System testing framework utility 115 may execute on top of a hardware platform (not shown) with components such as a CPU (also referred to as a processor or a processing device), a memory, and I/O interface hardware, for example. More or less components than described herein may be included in administration server 110. System testing framework utility 115 may include a test resource builder 230, a resource deployment module 232, a test deployment module 234, and a test interface module 236.

An end user, such as a system administrator, may access, interact with, and utilize the functionality of system testing framework utility 115 via test interface module 236. The interface module 236 may generate and provide a user interface (UI) to the end user, where the UI provides controls for the end user to direct and facilitate the testing of a product using system testing framework utility 115. In one implementation, a command-line interface (CLI) is provided by the test interface module 236 for interaction with the system testing framework utility 115. Once the end user has provided identification of a product for testing, including location of source code and/or code revisions for the product, the test resource builder 230 may be invoked to build test resources for the tested produce from the provided code and revisions to the code.

The test resource builder 230 may build test resources to implement a representation of the tested product. In one implementation, the test resource builder 230 access the provided source code location and uses the source code to build a package of files (e.g., RPMs) for each of the representations of the resources of the tested product. The resources of a tested product may refer to the servers and/or physical machines used to execute the functionality of the product in production.

The package of files for each representation of a resource of the tested product may include information such as, but not limited to, configuration parameters designed to control various operational aspects of the respective resources. Examples of configuration parameters may include hardware configuration parameters, operating system configuration parameters, virtual machine configuration parameters, and/or application configuration parameters.

The built resource packages representing the resources of the test product may be saved in a repository (local or external) accessible by the system framework utility 115. In one implementation, the repository is data store 106. Data store 106 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. In one implementation, the built resource packages are saved a resource package data 250 in data store 106.

The resource deployment module 232 may then access the save resource packages 250 for a tested product and utilize these packages to deploy VMs 221-222*a-b*, 223*a-d* representing each resource of the tested product in a virtual test system 220 running on a single host machine 210. The virtual test system 220 may refer to the collection of VMs 221, 2220*a-b*, 223*a-d* deployed on host machine 210 that represent an execution environment of the tested product. Host machine 210 may include a hardware platform 202 with components such as a CPU (also referred to as a processor or a processing device), a memory, and I/O interface hardware, for example. More or less components than described herein may be included in host machine 210. A host operating system (OS) 204 may be executed on top of hardware platform 202. Host OS 204 may cause a hypervisor 206 to be executed on node 120. In one implementation, hypervisor 206 is the same as hypervisor 122 described with respect to FIG. 1.

In one implementation, hypervisor 206 may emulate the underlying hardware platform 202 of the host machine 210 for the VMs, such as VMs 221, 222*a-b*, 223*a-d* of a virtual test system 220. In one implementation, VMs 221, 222*a-b*, 223*a-d* are the same as VMs 125 described with respect to FIG. 1. The hypervisor 206 may also be known as a virtual machine monitor (VMM) or a kernel-based hypervisor. In some implementations, the hypervisor 206 is part of the host OS 204 of the host machine.

VMs 221, 222*a-b*, 223*a-d* can be, for example, hardware emulation, full virtualization, para-virtualization, and operating system-level virtualization VMs. Each VM 221, 222*a-b*, 223*a-d* includes a guest OS that may differ among the VMs 221, 222*a-b*, 223*a-d*. The guest OS may host one or more applications within the VM 221, 222*a-b*, 223*a-d*. Moreover, the guest OSes and the host OS 204 may share the same OS type, or the host OS 204 may be a different type of OS than guest OSes.

In one implementation, the deployed VMs 221-222*a-b*, 223*a-d* representing the resources of the tested product are built using the packages created by test resource builder 230. In addition, the VMs 221-222*a-b*, 223*a-d* are provisioned by resource deployment module 232 to be able to network with one another via a network bridge. In one example, a Hyper-Text Transport Protocol (HTTP) server may be installed on a local virtual network of the virtual test system 220.

As illustrated in FIG. 2, the virtual test system 220 may include VMs such as a management engine VM 221, storage VMs 222*a-b*, and hypervisor VMs 223*a-d*. The number and types of VMs deployed in a virtual test system 220 may vary based on the configurations of a tested product and are not necessarily limited to those depicted and described herein. For example, the VMs 221, 222*a-b*, 223*a-d* are an exemplary collection of VMs that may be utilized to provide a virtual test environment for a platform virtualization management web application product. As such the hypervisor VMs 223*a-d* are each shown as executing one or more virtual VMs 225*a-d* inside each hypervisor VM 223*a-d*. In this example, the hypervisor VMs 223*a-d* are configured to enable nested virtualization.

The resource deployment module 232 may create template and snapshots for each VM 221, 222*a-b*, 223*a-d* of the tested product. These templates and snapshots may be stored in VM snapshots and templates 251 of data store 106. As previously discussed, a snapshot may refer to an image of the state of a system (all stored information about the system at the given instant in time) at a particular point in time. The image may be stored in a non-volatile form such as a file. A template may be a snapshot image that is used for generating a base image for particular type of VM (e.g., hypervisor VM 223*a-d*) in the virtual test system 220.

In one implementation, the resource deployment module 232 creates a local repository for the data (e.g., built packages, VM snapshots & templates, test configurations 252 and data 253, etc.) used in the testing phase of the product. The local repository may be part of host machine 210, or may be configured network access by host machine 210.

The test deployment module 234 may then be invoked to install the tested product from the locally-served repository. The tested product may be installed using the source code and revisions of the tested product, as well as the packages built from the source code. The test deployment module 234 may save snapshots of the installed testing environment of virtual test system 220 as a "clean state" for the virtual test system. This clean slate test-phase snapshot may be stored as VM snapshot 251 in data store 106 and/or in the local repository of the virtual test system 220.

The test deployment module may cause tests (e.g., stored in tested software data 252) to be run on the installed product in the virtual test system 200, where the VMs 221, 222*a-b*, 223*a-d* interact with each other (e.g. over Internet Protocol (IP)), during the test phase as if there were regular machines in a production environment. Test result data may be saved as test results data 253 in data store 106 and/or in the local repository of the virtual test system 220. In addition, various testing scenarios can be run from the clean state test-phase snapshots, where each scenario starts from the clean state snapshots previously generated and stored.

Due to the use of virtual resources and the snapshot image of the virtual test environment, the test deployment module 234 can run multiple tests on the test product in virtual test system 220 without having to clean-up between test iterations. This is because the execute test environment can be torn down and destroyed after each test iteration, and the virtual test system 220 reverted to its "original state via the clean slate snapshot images. In addition, the test deployment module 234 can run multiple tests on the test product without having to provision multiple physical hosts, be independent of outside resources, and be independent of network and storage unavailability associated with these outside resources.

In addition, the virtual test system 220 created by the collection of VMs 221, 222*a-b*, 223*a-d* can be used to increase the concurrency of tests. A considerable amount of time for testing is allocated to building tested resources of the product into installable executables, deploying the executables to the VMs 221, 222*a-b*, 223*a-d*, and booting up from the snapshots. Building the resource and deploying the executables are done in a serial manner before the test can begin. However, the test deployment module 234 can reduce overall time of running all tests by cloning the deployed testing environment into other identical environments (either on the same host machine 210 or on another connected host machines). In one implementation, a fork process can be used to clone the virtual test systems 220 (e.g., fork the system after executables are deployed). The cloned environments can then be utilized to run additional instances of the test (e.g., using different system configurations, etc.).

Figure 3:
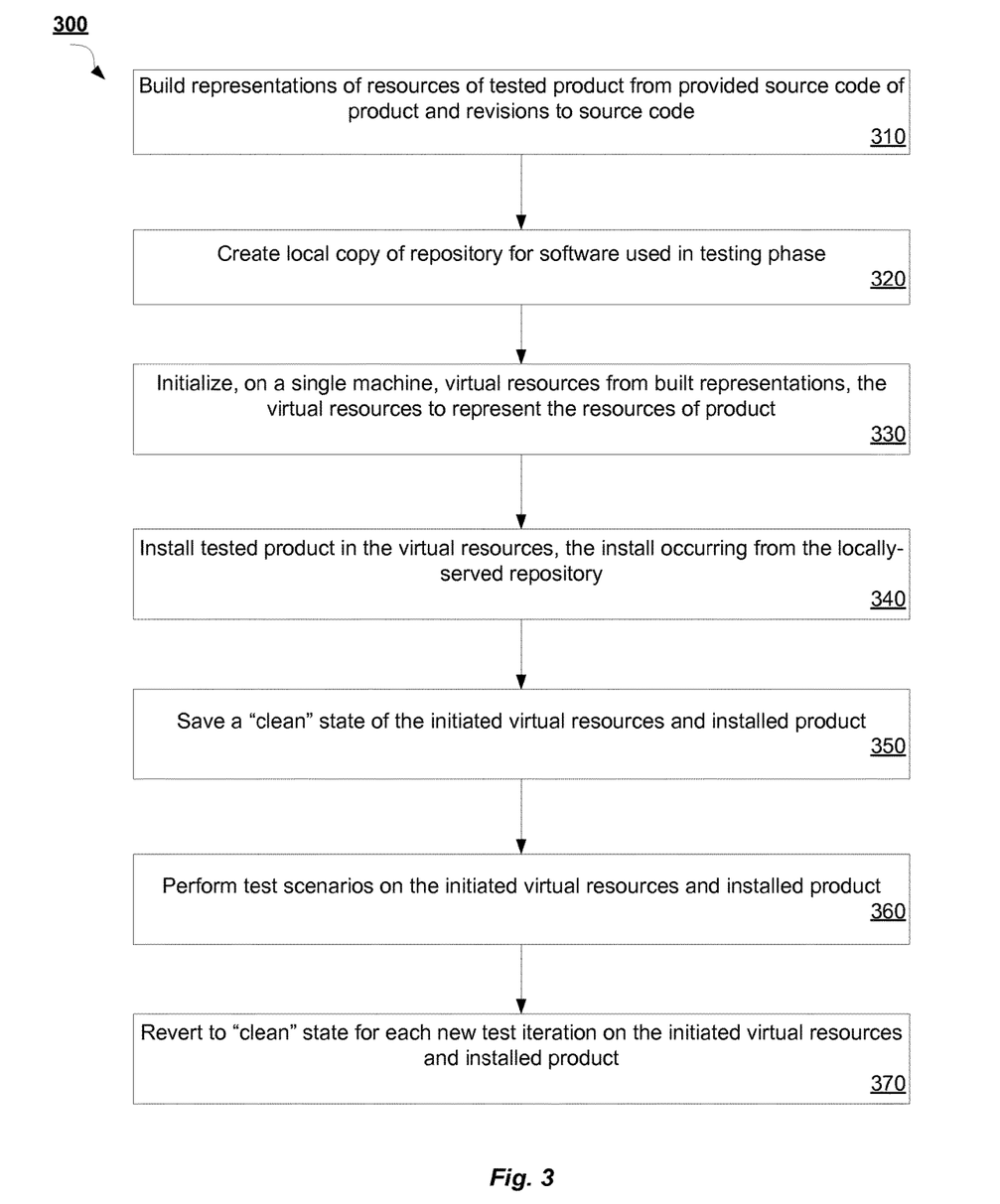
FIG. 3 is a flow diagram illustrating a method for testing of a product using a system testing framework for computer systems according to an implementation of the disclosure.

FIG. 3 is a flow diagram illustrating a method 300 for testing of a product using a system testing framework for computer systems according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by system testing framework utility 115 described with respect to FIGS. 1 and 2.

Method 300 begins at block 310 where representations of resources of a product to be tested are built. In one implementation, the representations are built from source code of the product and revisions to that source code. The representations may be an RPM including a package of files used to generate and configure the resource. At block 320, a local copy is generated of a repository for software of the product used in a testing phase. In one implementation, the local copy may be stored at a host machine providing a testing environment for testing of the product. In other implementations, the local copy is configured to be accessible from host machine providing the testing environment.

Subsequently, at block 330, virtual resources are initialized from the built representations. The virtual resources are initialized to represent the tested resources of the product in a virtual testing environment and all of the virtual resources are initialized on a single machine (e.g., the host machine). In one implementation, the virtual resources are VMs. At block 340, the product to be tested is installed in the virtual resources. The install may utilize the software stored in the local copy of the repository. At block 350, a "clean" state of the initiated virtual resource and installed product are saved. In one implementation the "clean" state is saved as a snapshot image in the local copy of the repository. Then, at block 360, test scenarios are performed on the initiated virtual resources and installed product. Lastly, at block 370, the virtual resources are reverted to the "clean" state by using the data of the saved "clean" state of the system. This "clean" state of the system can then be used to run additional iterations of testing on the installed product using the virtual resources.

Figure 4:
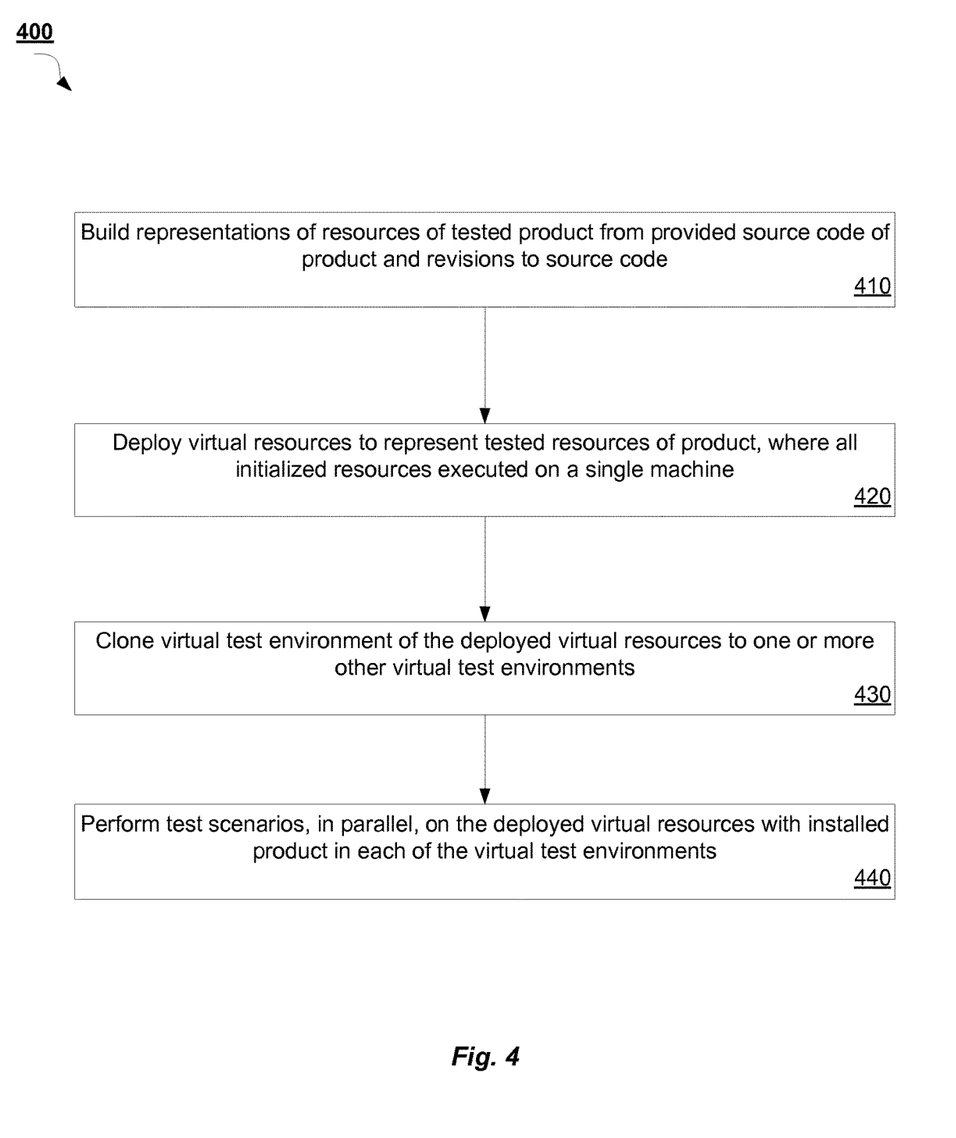
FIG. 4 is a flow diagram illustrating a method for concurrent testing of a product using a system testing framework according to an implementation of the disclosure.

FIG. 4 is a flow diagram illustrating a method 400 for concurrent testing of a product using a system testing framework according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by system testing framework utility 115 described with respect to FIGS. 1 and 2.

Method 400 begins at block 410 where representations of resources of a product to be tested are built. In one implementation, the representations are built from source code of the product and revisions to that source code. The representations may be an RPM including include a package of files used to generate and configure the resource. Then, at block 420, virtual resources are deployed to represent the tested resources of the product, where all of the virtual resources are initialized on a single machine (e.g., the host machine). In one implementation, the virtual resources are VMs.

Subsequently, at block 430, the virtual test environment of the deployed virtual resources is cloned to generate one or more other virtual test environments. In one implementation, a fork process is used to clone the virtual test environment. Lastly, at block 440, test scenarios are performed in parallel on the deployed virtual resources having an installed product to be tested in each of the virtual test environments.

Figure 5:
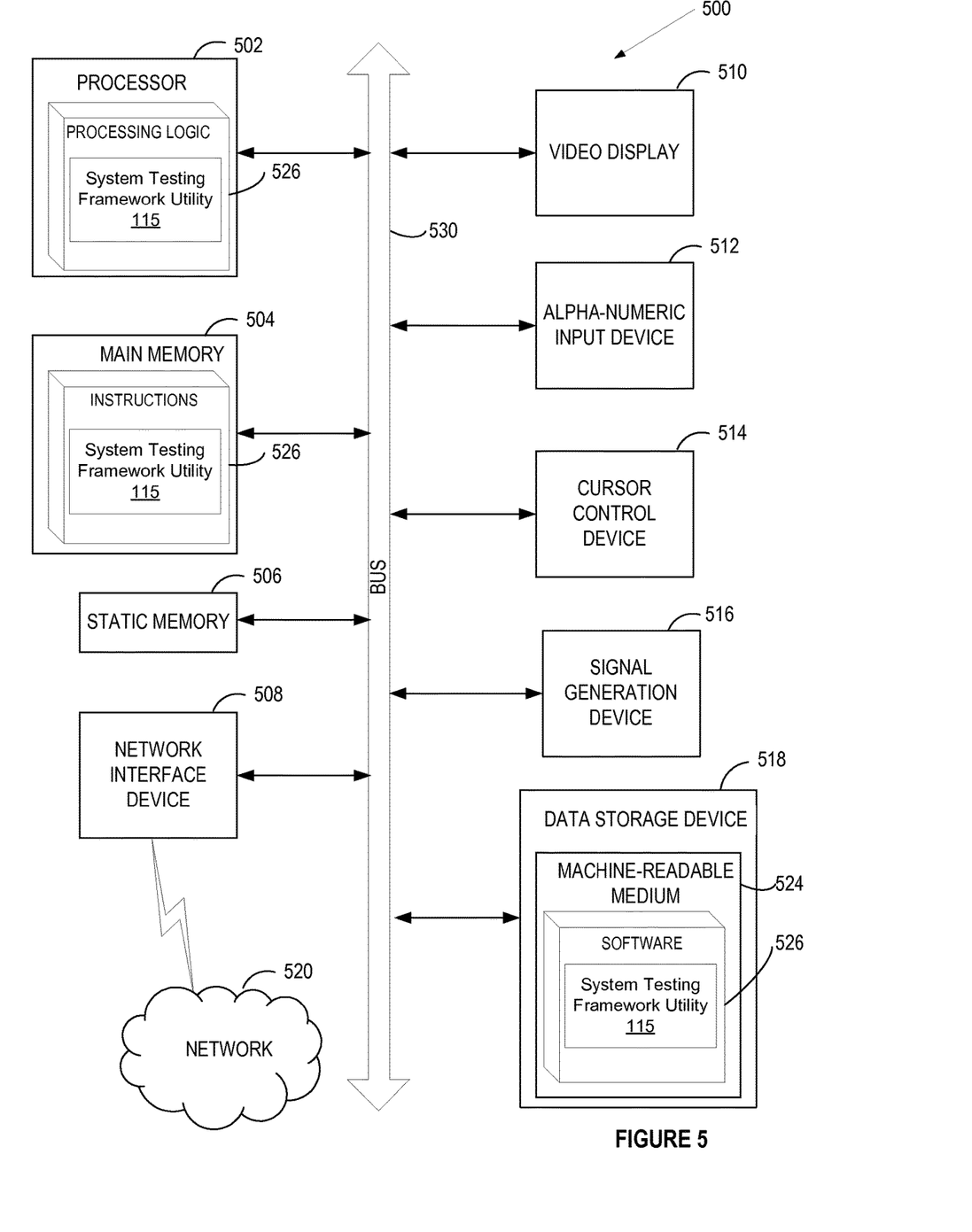
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement a system testing framework utility 115 to provide a system testing framework for a computer system, such as the computer system described with respect to FIG. 1, and/or a software library containing methods that call the above applications. While the machine-accessible storage medium 528 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "installing", "building", "installing", "saving", "causing", "reverting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   building, by a processing device, representations of resources of a product to be tested, the resources built from source code of the product and revisions to the source code;
   initializing, by the processing device on a single computing device, virtual resources from the representations;
   installing, by the processing device, software of the product on the initialized virtual resources;
   saving, by the processing device, a clean state of the initialized virtual resources and of the installed product on the initialized virtual resources;
   causing, by the processing device, a test scenario to be performed on the installed software of the product executing on the virtual resources; and
   reverting, by the processing device, the virtual resources and the installed software of the product to the clean state.

2. The method of claim 1, wherein the resources comprise one or more server computing devices.

3. The method of claim 1, further comprising receiving a location of the source code and the revisions to the source code.

4. The method of claim 1, wherein the virtual resources comprise virtual machines (VMs).

5. The method of claim 1, further comprising creating a local copy of a repository comprising the software of the product.

6. The method of claim 5, wherein installing the software on the initialized virtual resource further comprising accessing the local copy of the repository to obtain the software of the product for installation.

7. The method of claim 1, wherein the clean state is saved as a snapshot image.

8. The method of claim 1, further comprising:
   cloning the initialized virtual resources in one or more other virtual testing environments; and
   causing additional test scenarios to be performed on the installed software of the product executing on the virtual resources in the other virtual testing environments.

9. The method of claim 8, wherein a fork process causes the initialized virtual resources to be cloned.

10. A system, comprising:
    a memory to store an abstract data structure for an application; and
    a processing device communicably coupled to the memory, wherein the processing device is to:
    build representations of resources of a product to be tested, the resources built from source code of the product and revisions to the source code;
    initialize, on a single computing device, virtual resources from the representations;
    install software of the product on the initialized virtual resources;
    save a clean state of the initialized virtual resources and of the installed product on the initialized virtual resources;
    cause a test scenario to be performed on the installed software of the product executing on the virtual resources; and revert the virtual resources and the installed software of the product to the clean state.

11. The system of claim 10, wherein the virtual resources comprise virtual machines (VMs).

12. The system of claim 10, wherein the processing device is further to create a local copy of a repository comprising the software of the product, wherein the processing device to install the software on the initialized virtual resource further comprising the processing device to access the local copy of the repository to obtain the software of the product for installation.

13. The system of claim 10, wherein the clean state is saved as a snapshot image.

14. The system of claim 10, wherein the processing device is further to: clone the initialized virtual resources in one or more other virtual testing environments; and
cause additional test scenarios to be performed on the installed software of the product executing on the virtual resources in the other virtual testing environments.

15. The system of claim 14, wherein a fork process causes the initialized virtual resources to be cloned.

16. A non-transitory machine-readable storage medium including instructions that, when accessed by a processing device, cause the processing device to:
build, by the processing device, representations of resources of a product to be tested, the resources built from source code of the product and revisions to the source code;
initialize, by the processing device on a single computing device, virtual machines (VMs) from the representations;
install, by the processing device, software of the product on the initialized VMs;
save, by the processing device, a clean state of the initialized VMs and of the installed product on the initialized VMs;
cause, by the processing device, a test scenario to be performed on the installed software of the product executing on the VMs; and
revert, by the processing device, the VMs and the installed software of the product to the clean state.

17. The non-transitory machine-readable storage medium of claim 16, wherein the processing device is further to create a local copy of a repository comprising the software of the product.

18. The non-transitory machine-readable storage medium of claim 16, wherein the clean state is saved as a snapshot image.

19. The non-transitory machine-readable storage medium of claim 16, wherein the processing device is further to:
clone the initialized virtual resources in one or more other virtual testing environments; and
cause additional test scenarios to be performed on the installed software of the product executing on the virtual resources in the other virtual testing environments.

20. The non-transitory machine-readable storage medium of claim 19, wherein a fork process causes the initialized virtual resources to be cloned.

* * * * *